US011216782B2

(12) United States Patent
Randall (10) Patent No.: US 11,216,782 B2
(45) Date of Patent: Jan. 4, 2022

(54) INSURANCE SYSTEM (71) Applicant: Randall Innovations Pty Ltd, Inverell (AU)

(72) Inventor: Peter John Randall, Inverell (AU)

(73) Assignee: RANDALL INNOVATIONS PTY LTD, Inverell (AU)

(*) Notice: Subject to any disclaimer, the term of this patent is extended or adjusted under 35 U.S.C. 154(b) by 114 days.

(21) Appl. No.: 16/494,509

(22) PCT Filed: Mar. 16, 2018

(86) PCT No.: PCT/AU2018/050246
§ 371 (c)(1),
(2) Date: Sep. 16, 2019

(87) PCT Pub. No.: WO2018/165721
PCT Pub. Date: Sep. 20, 2018

(65) Prior Publication Data
US 2021/0125147 A1 Apr. 29, 2021

(30) Foreign Application Priority Data
Mar. 16, 2017 (AU) .............................. 2017900918

(51) Int. Cl.
*G06Q 10/10* (2012.01)
*G06F 30/10* (2020.01)
(Continued)

(52) U.S. Cl.
CPC ......... *G06Q 10/10* (2013.01); *G06F 3/04842* (2013.01); *G06F 30/10* (2020.01);
(Continued)

(58) Field of Classification Search
CPC ...... G06Q 10/10; G06Q 10/20; G06Q 30/018; G06Q 40/08; G06F 30/10; G06F 3/04842;
(Continued)

(56) References Cited

U.S. PATENT DOCUMENTS 7,818,187 B2 * 10/2010 Wahlbin ................. G06Q 40/08
705/4
8,150,196 B2 * 4/2012 Yang ........................ G06T 5/20
382/261
(Continued)

FOREIGN PATENT DOCUMENTS

WO 2009143319 A1 11/2009
WO WO-2018055340 A1 * 3/2018 ............. G06Q 10/10

OTHER PUBLICATIONS

Ishikawa, Randall, "Using drones in the insurance industry", ALM Media Properties, LLC., ProQuest Doc. Id. 1670992728, Apr. 2015.*
(Continued)

*Primary Examiner* — Frantzy Poinvil
(74) *Attorney, Agent, or Firm* — Armstrong Teasdale LLP (57) ABSTRACT

An online insurance system including a customer interface, configured to enable an insurance customer to enter insurance claim details, a tradesperson interface, configured to enable a tradesperson to provide cost estimates based at least in part on the insurance claims details, and an assessor interface, configured to enable an assessor to review the claim provided by the customer; and the cost estimates provided by the tradesperson.

19 Claims, 6 Drawing Sheets

(51) Int. Cl.
  *G06F 3/0484* (2013.01)
  *G06K 9/00* (2006.01)
  *G06Q 10/00* (2012.01)
  *G06Q 30/00* (2012.01)
  *G06Q 40/08* (2012.01)
  *G06T 17/00* (2006.01)
  *G01S 19/42* (2010.01)
  *G06K 19/06* (2006.01)

(52) U.S. Cl.
  CPC ......... *G06K 9/00664* (2013.01); *G06Q 10/20* (2013.01); *G06Q 30/018* (2013.01); *G06Q 40/08* (2013.01); *G06T 17/00* (2013.01); *G01S 19/42* (2013.01); *G06K 19/06037* (2013.01)

(58) Field of Classification Search
  CPC .......... G06K 9/00664; G06K 19/06037; G06T 17/00; G01S 19/42
  USPC .................................................. 705/4, 3–44
  See application file for complete search history.

(56) References Cited

U.S. PATENT DOCUMENTS

| | | |
|---|---|---|
| 8,401,276 B1 | 3/2013 | Choe et al. |
| 8,510,196 B1 | 8/2013 | Brandmaier et al. |
| 8,712,893 B1 | 4/2014 | Brandmaier et al. |
| 8,725,542 B1 * | 5/2014 | Hanson .............. G06Q 30/0283 705/4 |
| 9,672,567 B2 * | 6/2017 | Thomas ................. G06Q 40/08 |
| 10,430,886 B1 * | 10/2019 | Brandmaier ....... G06K 9/00791 |
| 10,832,065 B1 * | 11/2020 | Lambert ................... G06T 7/75 |
| 10,902,525 B2 * | 1/2021 | Kelsh ..................... G06Q 40/08 |
| 2012/0076437 A1 | 3/2012 | King |
| 2014/0081876 A1 * | 3/2014 | Schulz ................... G06Q 10/20 705/305 |
| 2015/0062120 A1 | 3/2015 | Reisner-Kollmann et al. |
| 2016/0239922 A1 | 8/2016 | Jimenez |
| 2016/0314440 A1 * | 10/2016 | Bersot ................... G06F 3/0481 |
| 2016/0328801 A1 * | 11/2016 | Laurentino ........ H04N 21/2543 |
| 2016/0335727 A1 | 11/2016 | Jimenez |
| 2019/0073641 A1 * | 3/2019 | Utke ...................... G06Q 10/20 |
| 2020/0349370 A1 * | 11/2020 | Lambert ................. G06Q 40/08 |

OTHER PUBLICATIONS

International Search Report for International Application No. PCT/AU2018/050246, dated Jun. 28, 2018, 9 pages.

Written Opinion of the International Searching Authority for International Application No. PCT/AU2018/050246, dated Jun. 28, 2018, 8 pages.

Oliver Baecker et al. 'Mobile Claims Management: Smartphone Apps in Motor Insurance', I.VW Management-Information, Dec. 2010, 4:13-18. St. Gallen, Switzerland. Abstract.

* cited by examiner

INSURANCE SYSTEM

TECHNICAL FIELD

The present invention relates to insurance. In particular, although not exclusively, the invention relates to residential insurance, and the processing of claims relating thereto.

BACKGROUND ART

Typically, an insurance claim is initially made by filling out one or more forms, which describe the damage to which the claims relate. The forms may be completed online, or sent in by paper to the insurance company.

The insurance company then initially reviews the claim, based upon the completed forms, upon which an insurance company is often sent out to assess the claim. The insurance company initially assesses any damage or loss, as well as the validity of the claim in relation thereto, and estimates, among other things, a preliminary cost associated with the damage or loss.

One or more repair quotes are then generally obtained by engaging one or more tradespeople. For damage to a house, for example, one or more tradespeople typically travel to the house, and estimate the cost of repairs based upon their own on-site assessment and instructions from the insurance company.

A problem with such insurance claims processing of the prior art is that it is not efficient. Particularly in remote areas, the travel time for insurance companies and tradespeople is very high. Furthermore, if a measurement is missed or a mistake is made, it is very time consuming to correct that mistake, particularly if additional travel is required.

A further problem with such insurance claims processing is that insurance companies are working in unfamiliar environments, and travelling long distances, which may be hazardous.

Attempts have been made at reducing the amount of travel and time spent on site when assessing and quoting in relation to insurance. These may rely on the insured assessing the damage, and making measurements for the purposes of generating quotes. However, the insured is generally not trained in insurance assessment, and as such, is often unable to provide reliable assessment data.

A further problem with self-assessment of damage (i.e. the insured assessing the damage) is that there are often issues communicating the level of damage, as well as other miscommunications. As an illustrative example, instructions may be misinterpreted, resulting in incorrect measurement or analysis being performed.

Yet a further problem with self-assessment of damage is that it is prone to fraudulent claims. In particular, it is difficult for an insurance company to determine whether a self-assessment of damage is true or not, when the insured is responsible for documentation thereof. This is particularly the case if the insured opts for a payout rather than repair.

As such, there is clearly a need for an improved insurance system.

It will be clearly understood that, if a prior art publication is referred to herein, this reference does not constitute an admission that the publication forms part of the common general knowledge in the art in Australia or in any other country.

SUMMARY OF INVENTION

The present invention is directed to online insurance methods and systems, which may at least partially overcome at least one of the abovementioned disadvantages or provide the consumer with a useful or commercial choice.

With the foregoing in view, the present invention in one form, resides broadly in an online insurance system including:

a customer interface, configured to enable an insurance customer to enter insurance claim details;

a tradesperson interface, configured to enable a tradesperson to provide cost estimates based at least in part on the insurance claims details; and an insurance company interface, configured to enable an insurance company to review the claim provided by the customer; and the cost estimates provided by the tradesperson.

Preferably, the insurance company interface is further configured to enable the insurance company to select the tradesperson.

Preferably, the system is configured to provide at least a portion of the insurance company interface prior to the tradesperson being provided with the tradesperson interface. As such, the insurance company is able to pre-filter claims prior to involving a tradesperson.

Preferably, the customer interface is configured to allow the insurance customer to gather evidence relating to the claim. The evidence may be in the form of one or more images.

The customer interface may be configured to automatically obtain global positioning system (GPS) data, and associate the GPS data with the one or more images. The GPS data may then be provided in the insurance company interface, enabling the insurance company to review a location in which the images were captured.

The customer interface may be configured to enable the insurance customer to record voice (or other audio) and associate same with the images. This enables the insurance customer to, among other things, describe the images or damage.

The recorded voice may be automatically transcribed.

The images may comprise video sequence. The images may comprise multiple images of an object from different angles.

The tradesperson interface may be configured to generate one or more measurements based upon the images. The tradesperson interface may enable the tradesperson to select one or more points on an image, upon which a measurement is determine in relation thereto.

The measurement may be performed by comparing the location of the points in multiple images.

This measurement may be performed by determining a reference measurement on the image, and then using the reference measurement to determine the measurement. The reference measurement may be determined with assistance from the tradesperson. In particular, the tradesperson may identify the reference measurement by placing markers on the image, and enter size data associated with the reference measurement.

The measurement may be performed by creating a three-dimensional model, and by determining the measurement with reference to the three-dimensional model.

The system may utilise known characteristics of the camera used, such as focal length, in determining the measurement.

The tradesperson interface may include one or more pricing elements, each of which is selectable by the tradesperson to provide the cost estimate.

The insurance company interface may be configured to enable an insurance company to request further information from the customer.

The system may be configured to select the tradesperson, or set of tradespeople, automatically. The tradespeople may be selected based upon location, type of service required, or any other suitable factor.

The system may also be configured to identify specific objects in the images. The system may be configured to identify potential hazards.

The system may be configured to select the insurance company of a plurality of insurance companies, and allocate the claim to the insurance company. This may be used to provide distribution of workload to the insurance companies based upon a suitable metric, such as workload.

The system may be configured to guide the customer in how to capture images. This may include instructions on how to move a customer device while capturing images. The instructions may be according to a predefined capture pattern. The system may warn the customer when motion deviates from the pattern.

Insurance policy documents of the customer may include a QR-code, associated with the customer interface. The QR code may provide a link to an app providing the customer interface.

The QR-code may include an identifier identifying the customer. The system may be configured to automatically retrieve details of the customer according to the identifier.

The system may further be configured to generate alerts and/or warnings to the customer.

In another form, the invention resides broadly in an online insurance method including:

receiving, on a data interface, insurance claim details from an insurance customer;

enabling an insurance company to remotely review the claim provided by the customer;

receiving, on a data interface, cost estimates from a tradesperson according to the received insurance claim details; and enabling the insurance company to review the cost estimates provided by the tradesperson.

The method may include automatically allocating an insurance claim, associated with the received insurance claim details, to the insurance company.

The method may include allocating the insurance claim to the tradesperson. The method may include receiving selection of the tradesperson from the insurance company.

The insurance claim detail may include one or more images. The method may include determining measurements using the one or more images.

In yet another form, the invention resides broadly in an online measurement method including:

receiving one or more images relating to an object;

receiving at least two location identifiers relating to the object with reference to the images; and analysing the object with reference to the images and the location identifiers to generate a real world measurement associated with the location identifiers.

This method will preferably allow accurate measurement using a limited number of images obtained from non-specialized low end photographic equipment.

The method may include receiving a reference measurement with reference to the images, and generating the real world measurement with reference to the reference measurement.

The method may include generating a three-dimensional model of the object, and generating the real world measurement with reference to the reference measurement.

According to this method a set of images of the structure or object of interest are typically taken. Given the prevalence of digital cameras, the images will normally be available in digital form and preferably will be uploaded into the system in that form. The digital form means that certain information will be provided with the images in relation to resolution and the like.

The images are preferably linkable, that is that there is at least one and preferably more than one common points in at least two and preferably in multiple images such as to allow the system of the invention to be able to relate the relative positions and aspects of the various images to each other in an electronic form.

It is preferred that at least one and preferably all features of interest appear in a minimum of two images. This will preferably allow the system of the invention to link the images and to build a consolidated view of the features of interest.

The images are preferably taken at various angles. Angles approaching 45 degrees will typically provide the highest accuracy of distance or length measurement which will in turn, increase the accuracy of the consolidated view.

Typically a measurement reference appears in at least two images (not necessarily the same images as the features of interest).

The system will preferably be loaded with planes of interest from which it will create final images or consolidated views that allow measurement of features within the images or views. Any one of the images can be nominated as the reference source and measurement can take place in any plane of interest.

In a preferred embodiment, to build a set of planes of interest the following process is followed:

a) The original images typically have distortion correction applied based on knowledge of the photographic equipment used to create prepared images. This may be a part of the information that is provided as a part of the image upload to the system.

b) The prepared images are then preferably processed through a chosen pathway using photogrammetry software. This process will typically generate a mesh of 2D data (a consolidated 2D view) based on the 2D images that have been processed.

c) The mesh is then extracted.

d) The mesh is then preferably processed to provide the relative 3D camera positions available for the operator to use as the basis for movement of the constructed consolidated view. This processing will preferably estimate three-dimensional coordinates of points on an object or feature employing measurements made in two or more photographic images taken from different positions, the measurements based on the measurement references in at least one of the images. Common points are typically identified on each image. A line of sight can then preferably be constructed from the camera location to the point on the object. It is the intersection of these rays (triangulation) that will determines the three-dimensional location of the point.

e) An operator is then able to nominate at least one plane of interest in at least two images (typically using three points in each) or alternatively nominates at least one plane of interest in a 3D reconstruction.

f) The nominated points are then typically combined mathematically with the relative camera positions to estimate the true position of each nominated plane in 3D space. Note: Since there is actually only one true position if there were no errors these two (or more) estimates would coincide.

g) The translations necessary to align the planes identified in the images to the real position are then preferably identified.

h) These translations are then typically applied to all pixels within the area bounded by the three points from within each prepared image or these translations be applied to relevant points in the related 3D reconstruction.

i) These two (or more) created images are then preferably tuned until they coincide with each other to further remove introduced error. NOTE: The amount of adjustment could be fed back round the process loop in order to improve the outcome over multiple iterations.

j) This provides a close to true representation of the position and orientation and pixel map of the nominated plane in 3D space.

k) A normal to this plane is then preferably calculated which intersects the plane at a point midway between the three nominated points (or some other option).

l) A distance then preferably set or chosen although it is to be noted here that it is extremely difficult to quantify what is a "good" distance.

m) A finalview is then created and presented to the operator.

n) Distances identified on the finalview can be reported as ratios of the nominated reference or if the reference distance(s) have been specified as measures.

The method therefore creates a newview that represents what would be seen if the best position and orientation for relative measurement had been chosen from images that have been taken. This best position is preferably located at a position at the normal to the plane that the object(s) to be measured occur in.

The newview will typically have an image size such as to fit (at the highest pixel density possible) the area or object of interest.

The newview is preferably calculated from two or more pathways such that errors can be tuned out by either similarity scoring between the results or by operator interaction in a similar fashion to focusing to create a final view.

The newview representations may be further processed to again reduce the errors originally introduced by the low quality/size of the original photographic equipment to create a final image.

The online insurance system and method will preferably include one or more preferred aspects of the online measurement method.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
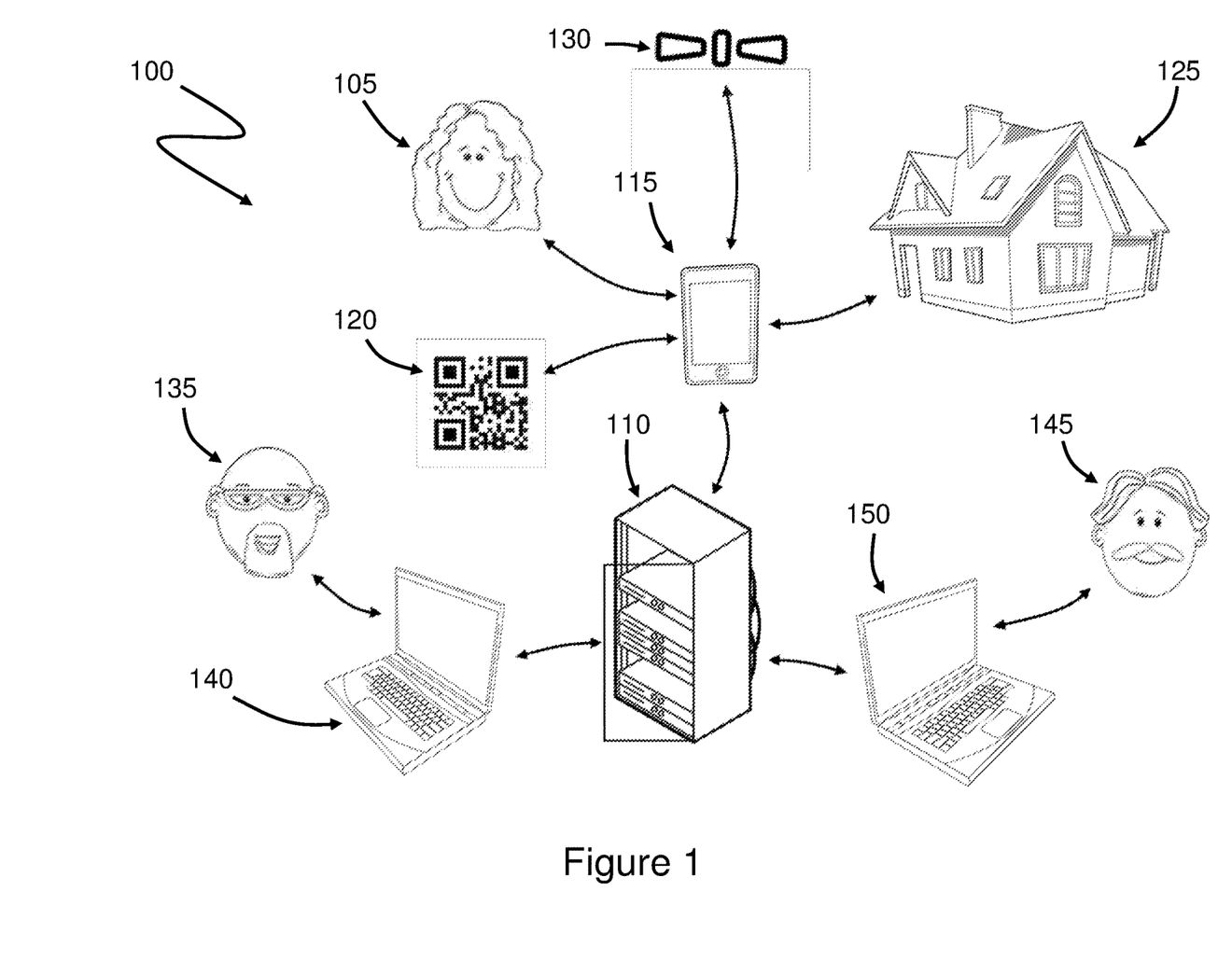
FIG. 1 illustrates an online insurance system, according to an embodiment of the present invention.

FIG. 1 illustrates an online insurance system 100, according to an embodiment of the present invention. The insurance system 100 enables claims to be processed without requiring multiple site visits by insurance companies or tradespeople, simplifies the insurance claim lodgement process, speeds up the insurance claim process, and gives control back to customers in relation to the process.

A customer 105 connects to a central server 110 using a customer device 115, such as a smartphone, and over the internet, to manage their insurance and process insurance claims. In particular, the customer device 115 may include an application (app), which is configured to connect to the server 110 and being specifically configured for managing the client's insurance.

In some embodiments, insurance policy documents of the customer 105 include a QR-code 120, or similar, providing a link to the application. The link may include a unique identifier of the customer 105, such that the customer's details may be retrieved from the server 110. This enables the customer 105 to easily install and configure the app on the customer device 115, which is advantageously done prior to needing to make a claim.

The app may also enable the customer 105 to mange his or her insurance policy more generally. For example, the app may allow the customer 105 to update his or her insurance details, such as by updating limits or levels of cover, updating an excess associated with an insurance policy, or specifying and documenting specific property to be covered (e.g. newly acquired jewellery).

Furthermore, the app may include an inbuilt policy renewal feature that allows the customer 105 to renew his or her policy directly therefrom, including the updating any details that have changed since the previous renewal. As such, the app may encourage the customer 105 to maintain an updated policy details and coverage.

When an incident occurs, e.g. at an insured premises 125 (such the customer's house), the customer 105 enters details of the incident into the app to make a claim. This may include selecting a type of incident (e.g. storm damage, theft) and an area of the premises 125 where the incident occurred (e.g. kitchen).

The initial details are analysed, and the customer 105 is prompted to enter further details based upon the initial details (e.g. based upon the type of incident and/or the area).

For example, if the incident relates to a damaged kitchen in the house 125, the customer may be prompted to describe the kitchen, and take images of the kitchen from various angles.

Preferably, the app is configured to guide the customer in how to capture images, by overlaying instructions onto an image capture component of the app. The instructions may, for example, comprise a template in which the area is to be contained, and/or instructions on how to move the customer device 115 such as to capture images from a sufficient number of angles.

Figure 2:
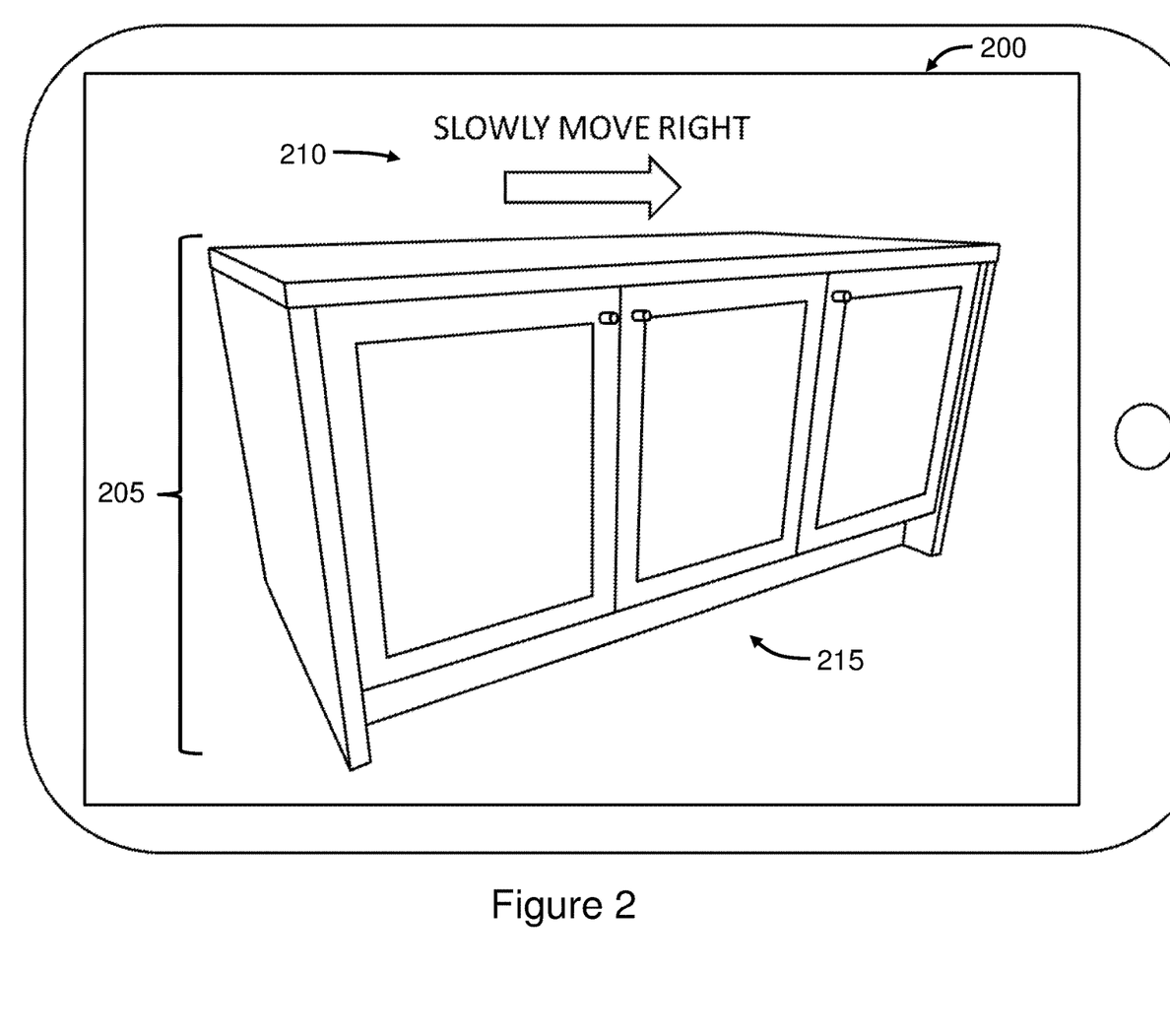
FIG. 2 illustrates a screenshot of an image capture screen of the system of FIG. 1, according to an embodiment of the present invention.

FIG. 2 illustrates a screenshot 200 of an image capture screen of the system 100, according to an embodiment of the present invention. The image capture screen enables the customer 105 to capture a sequence of images relating to the damage, and the screen guides the user in how to best capture such images.

In particular, the image capture screen includes an image display portion 205, illustrating to the customer the image being captured, and an instruction portion 210, providing instruction to the user. The instruction may provide a predefined capture pattern (e.g. panning from left to right), which is updated as the user follows the instructions. The instruction may warn the customer 105 when he or she moves too quickly, or when motion outside of predetermined parameters is detected. As a result, the images captured illustrate the item from various angles, which enables geometry to be used to determine depth and distance.

In some embodiments, the system 100 tracks an object 215 being captured, and provides instructions to assist the user in capturing the object 215 from a sufficient range of angles. This may include estimating a change in angle in which the object has been captured, and comparing same to one or more predefined angle ranges to generate the instructions.

According to certain embodiments, the image capture may utilise hybrid focusing methods including phase detection, laser assisted focusing, and dual camera (stereoscopic) technology. Similarly, the image capture may include depth data, e.g. from laser scanners or other technology, as well as motion data, such as accelerometer and or gyroscope output data.

The customer device 115 is configured to obtain Global Positioning System (GPS) data from a GPS satellite 130 and associate this data with the captured images. In such way, the system 100 is able to confirm that the images were taken at the area in which they are said to be taken, which may reduce fraud and location-based errors.

The customer device may include assisted GPS, and supplement GPS data with other location-based data, to provide accurate data both indoors and outdoors.

According to certain embodiments, voice (or audio) is captured with the images. In such case, the images may comprise video with an associated audio track, or one or more still images with an associated audio file. This is particularly useful when the customer 105 is describing an incident with reference to the captured images.

In some embodiments, the captured audio may be automatically transcribed. This is particularly useful as it enables analysis of what is being said, and enables a written report to be generated.

The images and the further data are uploaded to the server 110, and associated with the customer 105. The skilled addressee will readily appreciate that images may be uploaded as they are captured, rather than once all data is entered. This enables the server 110 to pre-process the images and make further requests based thereon. In particular, instruction to the customer 105 may be generated based upon analysis of the data as it is provided.

Once the images and other data is received at the server 110, and no action is outstanding on behalf of the customer 105, the server 110 issues an alert to an insurance company 135. This may be in the form of an email, or through entry of a task in a task management system, for example.

The server 110 may be configured to select the insurance company 135 of a plurality of insurance companies, and allocate the claim to the insurance company 135. This enables distribution of workload to insurance companies based upon any suitable metric, such as workload.

The insurance company 135 logs onto the server 110 using an insurance company device 140, such as a personal computer or smartphone, and initially reviews the submitted material.

Figure 3:
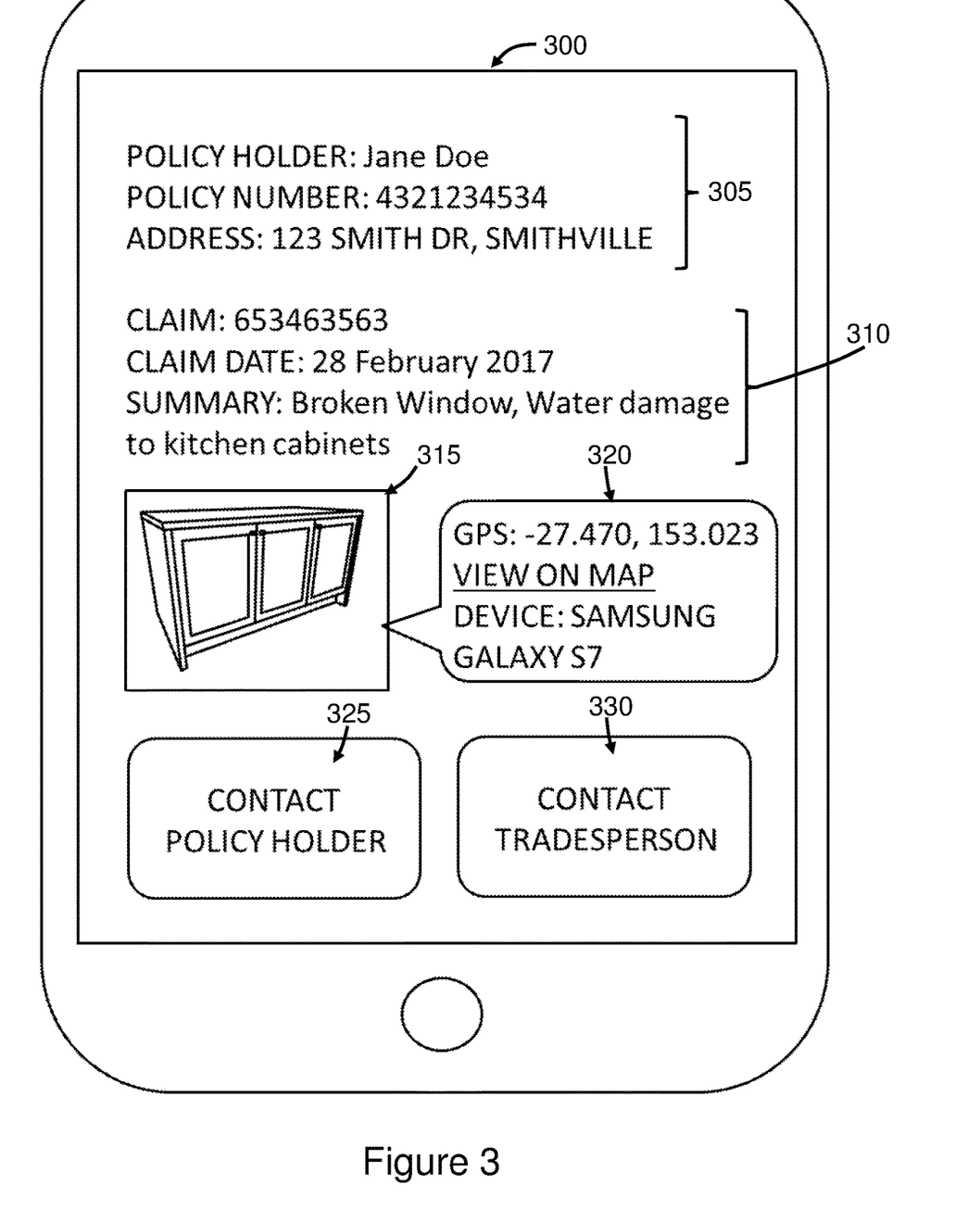
FIG. 3 illustrates a screenshot of an exemplary claim review screen of the system of FIG. 1, according to an embodiment of the present invention.

FIG. 3 illustrates a screenshot 300 of an exemplary claim review screen, according to an embodiment of the present invention.

The claim review screen includes a policy details portion 305, which includes policy holder details, policy number and address, and a claim details portion 310, including a claim number, claim date and a claim summary.

The claim review screen further includes a photo element 315, corresponding to one or more images captured by the user. A details bubble 320 is also associated with the photo element 315, which includes details of the image(s), including captured GPS coordinates associated with the image, and a device on which the images are captured.

When multiple images (or groups of images) are provided by the customer 105, the insurance company 135 is able to navigate between the images (or groups of images) by swiping. In such case, the details bubble 320 is also updated to correspond to the displayed image. Similarly, if audio is associated with an image (or group of images), or the group of images comprises a video with a corresponding audio track, the audio may be played to the insurance company 135 when the image(s) are displayed.

As such, the insurance company 135 is able to get a good overview of the policy and claim using the policy details portion 305 and the claim details portion 310, respectively, and view the evidence captured by the customer 105 using the photo element 315, together with the associated details, to preliminarily assess merit of a claim and identify any immediate deficiencies.

If any deficiencies are identified, the insurance company 135 may contact the customer 105 using a contact-policyholder button 325. In such case, the insurance company 135 may pose questions to the customer 105 in case certain mattes are unclear, or request specific further information from the customer 105, for example if a photo is unclear or doesn't illustrate a particular detail relating to the claim.

If no deficiencies are identified, the insurance company 135 may allocate the claim to a tradesperson to perform a quote for repair relating to the incident, using a contact-tradesperson button 330. The system 100 may also select a suitable tradesperson (or subset of tradespeople) automatically based upon location, type of service required, or any other suitable factor.

Once the tradesperson 145 is selected, the server 110 issues an alert to the tradesperson 145. This may be in the form of an email, or through entry of a task in a task management system, for example, and may be similar or identical to how the task is allocated to the insurance company 135.

The tradesperson 145 then connects to the server using a tradesperson device 150, and retrieves details of the claim. The tradesperson 145 may be prompted to accept or decline the request.

The tradesperson 145 is able to use the images captured by the user to generate measurements, as outlined below. In particular, one or more points on the image are selected by the tradesperson, such as ends of a cabinet, portions of a floor, or any other suitable area that requires measurement.

The system then compares the location of the points in multiple images, and uses to image analysis to determine a distance therebetween. This may include determining reference measurements on the image, either with assistance from the tradesperson, or automatically, and then using the reference measurements to determine real-world measurements.

As such, the tradesperson 145 is able to generate sufficiently accurate cost estimates without having to travel to the property. This reduces the overall costs associated with the services of the tradesperson.

Figure 4:
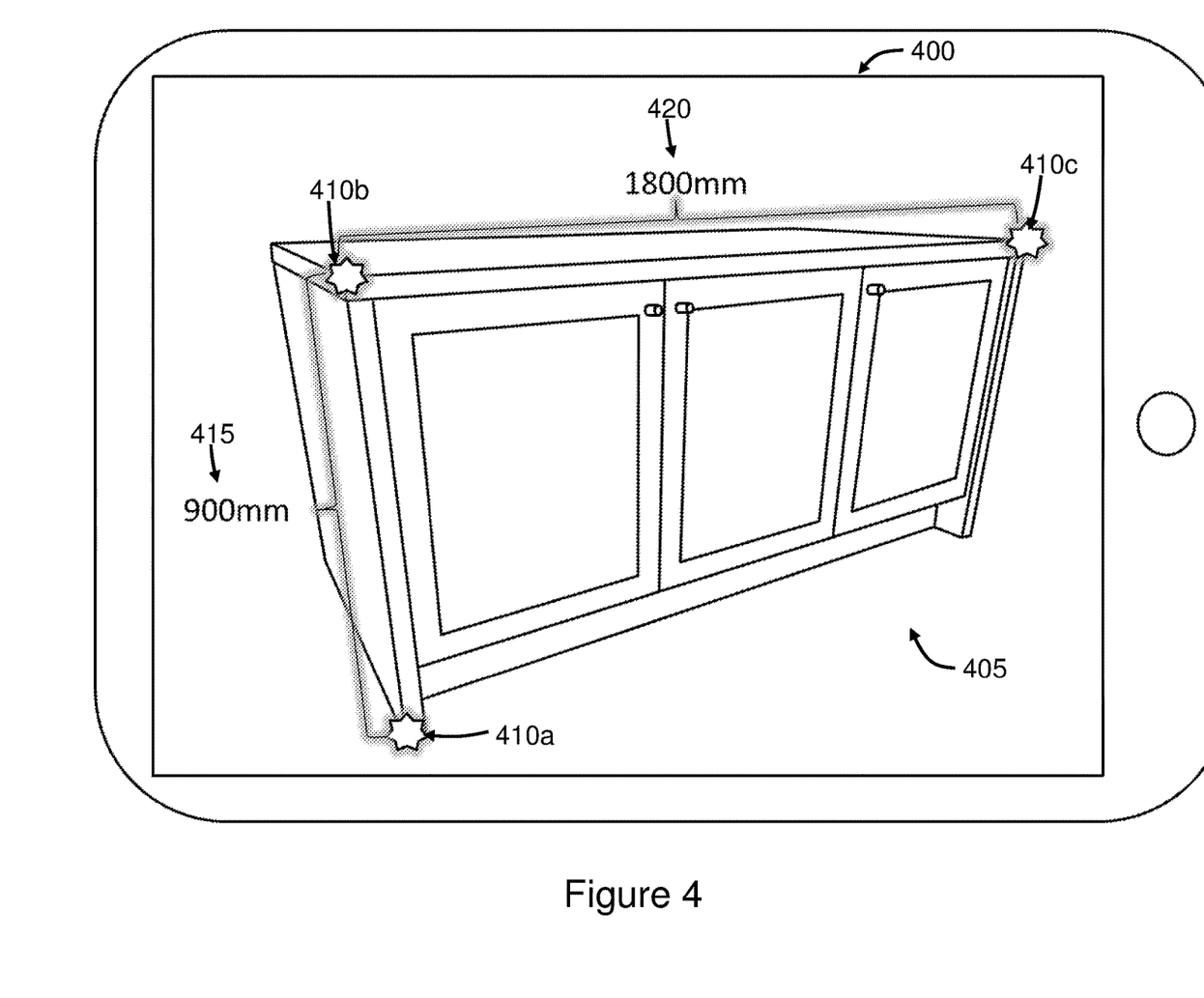
FIG. 4 illustrates a screenshot of a tradesperson review screen of the system of FIG. 1, according to an embodiment of the present invention.

FIG. 4 illustrates a screenshot 400 of a tradesperson review screen, according to an embodiment of the present invention. The tradesperson review screen enables the tradesperson to select portions of an image to generate measurements based thereon, and otherwise review the damage at the property.

The tradesperson review screen includes an image element 405, corresponding to one or more images captured by the customer 105. The tradesperson 145 may select an appropriate image of several images as a starting point.

The tradesperson 145 then identifies a reference measurement by placing two (or more) markers 410 on the image. In this case, the tradesperson 145 has selected a bench height as being the reference measurement by placing a first marker 410a at a lower end of the bench, and a second marker 410b at an upper end of the bench. The tradesperson 145 then enters size data (i.e. a height), in this case 900 mm, associated with the reference measurement, which is displayed as a reference data element 415.

After entering the reference measurement, the tradesperson 145 is able to enter a desired measurement by placing two (or more) markers 410 on the image. In this case, the tradesperson 145 has selected a bench length as being the desired measurement by placing the second marker 410b at one end of the bench, and a third marker 410c at the other end of the bench. The system 100 determines the size of the desired measurement (i.e. the length), in this case 1800 mm, which is displayed as a reference data element 420.

This process may be repeated for each measurement the tradesperson 145 requires.

The system 100 may determine a length of the desired measurement (i.e. the length of the benchtop) by creating a three-dimensional model of the benchtop (e.g. from several images) and comparing a length of the benchtop on the three-dimensional model to the length of the reference measurement (i.e. the height input by the tradesperson 145). In the example illustrated, the three-dimensional model may determine that the length of the benchtop is twice that of the reference measurement, and as such, the length may be determined by doubling the reference measurement.

In generating the three-dimensional model, the system may utilise known characteristics of the camera used, such as focal length. In this regard, the app may send details of the consumer device 115, such as a model identifier, to the server 110.

Once all measurements have been determined, the tradesperson 145 may determine a cost estimate, and enter the cost estimate into the system 100. The server 110 may then send the cost estimate to the insurance company 135 for approval.

According to certain embodiments, the customer is prompted to add a reference to the scene prior to taking a photograph. The reference may comprise a printed image or an object, of known size, which may be identified by the system, or by the tradesperson. This may be used instead of the reference data element 420 described above, and may provide increased accuracy.

The system 100 may allow the tradesperson 145 to pre-load one or more pricing elements onto the system, each of which is selectable when quoting work. This in turn simplifies the process of generating quotes for the tradesperson 145, as he or she may select pricing elements from a list to generate the quote.

The system 100 may also be configured to identify specific objects, such as appliances, or even hazardous substances, on site based upon the images. As an illustrative example, object recognition may be used to identify a specific type of stove in a kitchen or to identify an asbestos panel. Warnings, or cost data, may be generated based thereon.

Once the insurance company 135 has approved the quote, the job is allocated to the tradesperson 145, or a group thereof. The tradesperson 145 may then contact the customer 105, directly and through the app, to organise a time to perform repairs.

As the tradesperson 145 conducts the repairs, he or she inputs details thereof into the system 100. As such, the system 100 is able to provide job tracking, to both the customer and the insurance company. Furthermore, the system 100 may be configured to allow for variation claims, and organise invoices relating thereto, providing additional flexibility to the owner.

Furthermore, the system may comprise a claim tracking feature, where it allows the customer 105 to track a progress of the claim. In particular, the claim tracking feature will enable the customer 105 to follow the progress of their claim, including whether it has been approved by the insurance company, whether it is waiting quotes or cost estimates, or any other stage of the process.

In some embodiments, the system is configured to generate alerts to the customer, with a view of avoiding insurance claims. In particular, the alerts may be generated according to weather events, such as incoming hail, thunderstorms, cyclones and the like, advising the customer to take care.

Figure 5:
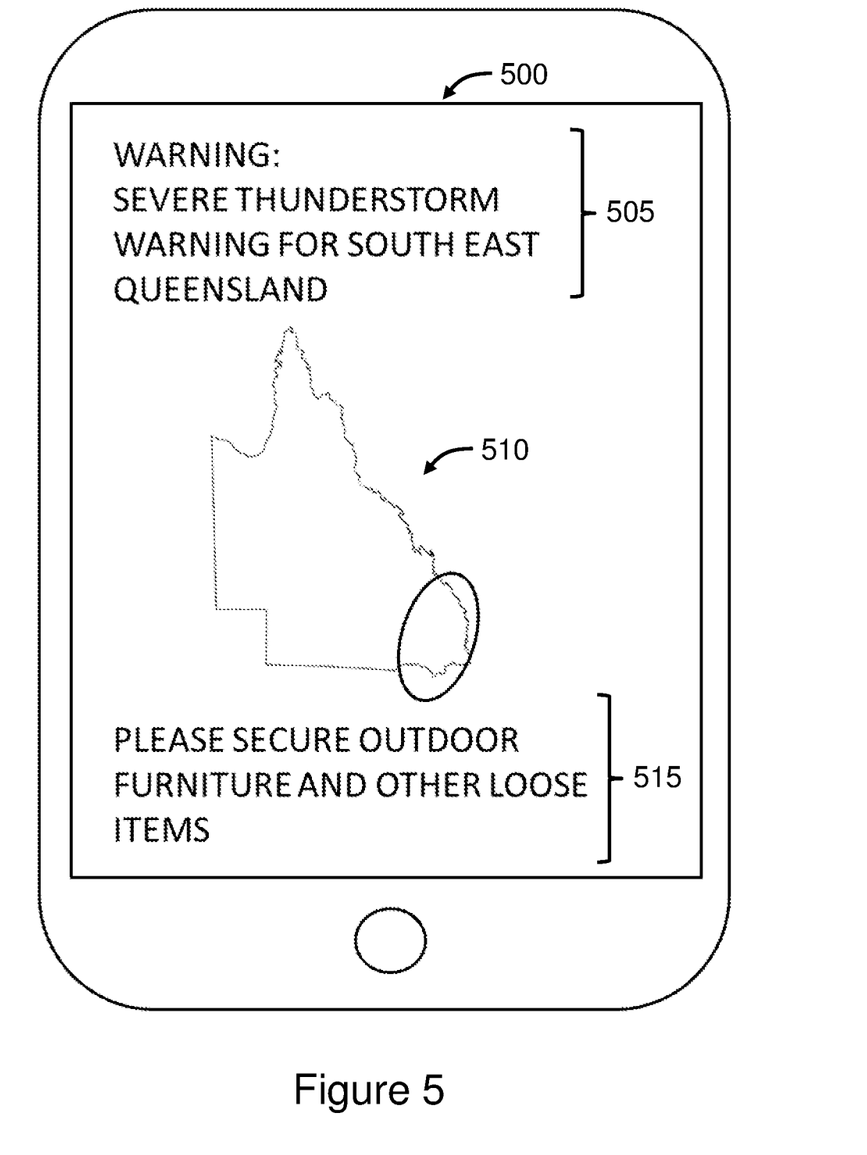
FIG. 5 illustrates a screenshot of an alert screen of the system of FIG. 1, according to an embodiment of the present invention.

FIG. 5 illustrates a screenshot 500 of an alert screen, according to an embodiment of the present invention.

The alert screen includes a warning element 505, a warning area in the form of a map 510, and a call to action element 515. The warning element 505 identifies the type of warning (e.g. thunderstorm), and the map 510 indicates the area in which the warning relates. The call to action element 515 provides one or more actions that the user can take to avoid damage, such as securing outdoor furniture and loose items in case of a storm.

By issuing alerts, the system 100 is not only able to manage claims and insurance policies, but even reduce the incidence of claim by encouraging the customer 105 to take precautionary action.

Figure 6:
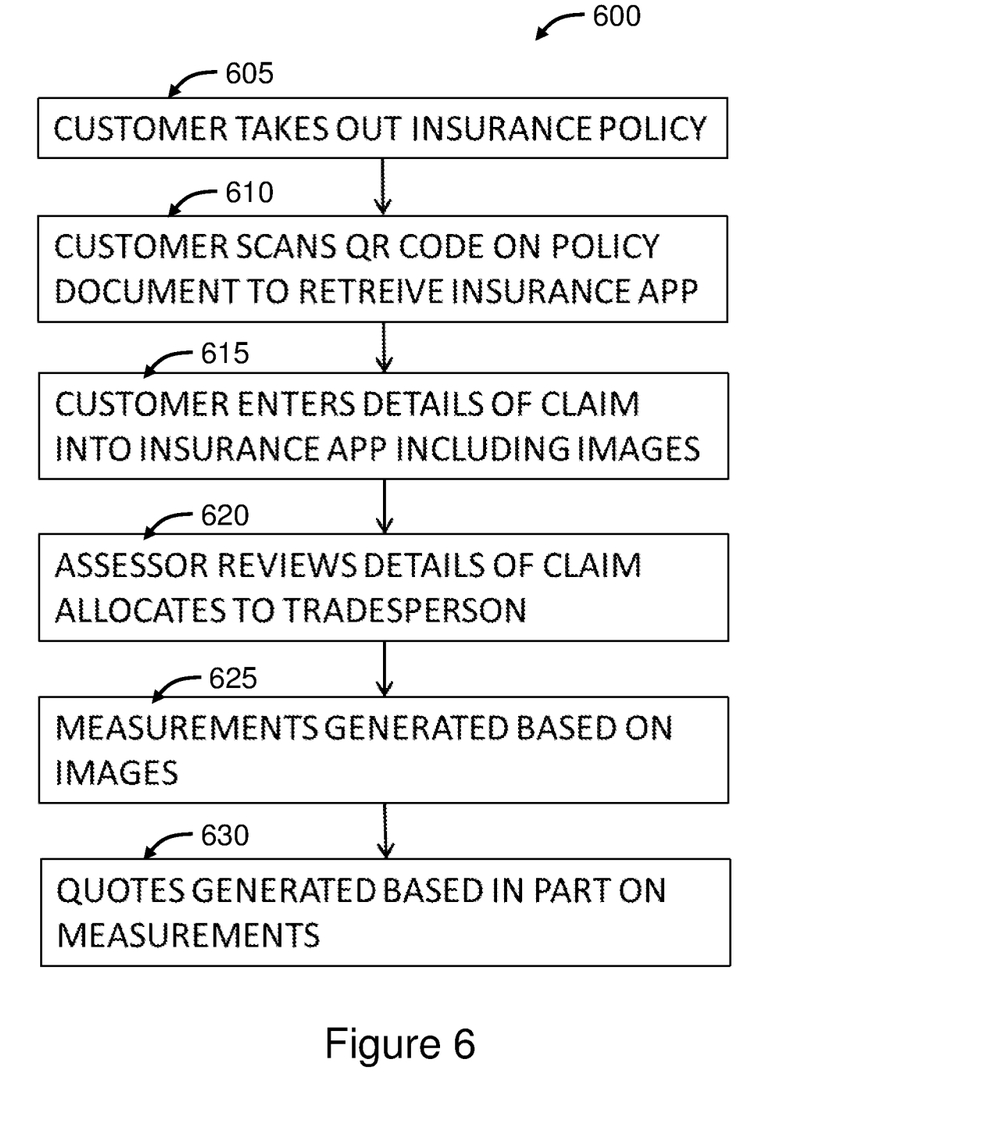
FIG. 6 illustrates an online insurance method, according to an embodiment of the present invention.

FIG. 6 illustrates an online insurance method 600, according to an embodiment of the present invention. The insurance method 600 may be implemented by the system 100, and enables claims to be processed without requiring multiple site visits by insurance companies or tradespeople, simplifies the insurance claim lodgement process, speeds up the insurance claim process, and gives control back to customers in relation to the process.

At step 605, a customer takes out a new insurance policy, and is provided with policy documents. The policy documents contain a QR code that encodes a URL to an insurance app.

At step 610, the customer scans the QR code associated with the policy with a customer device, which causes the URL to be entered. This in turn causes the customer device to connect to a server and retrieve the insurance app. The URL may comprise a URL of an app store, or any other suitable URL.

The URL may include a unique identifier associated with the customer. As such, upon receipt of the URL at the server, the server is able to identify the customer, and retrieve insurance policy details based thereon.

The app then runs in the background, and is ready to be used if a claim is needed. The app may push weather alerts and other warnings to the customer, as well as renewal messages over a lifetime of the policy.

At step 615, the user enters details of a claim. The details of the claim may include a location of damage, images of the damage, and a voice recording associated with the images. A notification may be provided to the customer to notify of receipt of claim.

At step 620, an insurance company reviews the claim details, and approves the claim for repairs. The claim is then allocated to a tradesperson for generating a cost estimate. At this time, details of approval of the claim can be sent to customer as well.

At step 625, the images are analysed, both manually and automatically. In particular, measurements are automatically generated based upon selected points and reference measurements, as outlined above. If further information is required from the customer, the tradesperson may liaise with the customer at this time also.

At step 640, a cost estimate (quote) is generated based in part on the measurements, and provided to the insurance company for approval.

According to certain embodiments, all interactions monitored to enable different parties to monitor a progress of a claim. In certain embodiments, each interested party may have different viewing permissions.

The online insurance system and method will preferably include one or more preferred aspects of the online measurement method.

According to the online measurement method a set of images of the structure or object of interest are typically taken. Given the prevalence of digital cameras, the images will normally be available in digital form and preferably will be uploaded into the system in that form. The digital form means that certain information will be provided with the images in relation to resolution and the like.

The images are preferably linkable, that is that there is at least one and preferably more than one common points in at least two and preferably in multiple images such as to allow the system of the invention to be able to relate the relative positions and aspects of the various images to each other in an electronic form.

It is preferred that at least one and preferably all features of interest appear in a minimum of two images. This will preferably allow the system of the invention to link the images and to build a consolidated view of the features of interest.

The images are preferably taken at various angles. Angles approaching 45 degrees will typically provide the highest accuracy of distance or length measurement which will in turn, increase the accuracy of the consolidated view.

Typically a measurement reference appears in at least two images (not necessarily the same images as the features of interest).

The system will preferably be loaded with planes of interest from which it will create final images or consolidated views that allow measurement of features within the images or views. Any one of the images can be nominated as the reference source and measurement can take place in any plane of interest.

In a preferred embodiment, to build a set of planes of interest the following process is followed:

The original images typically have distortion correction applied based on knowledge of the photographic equipment used to create prepared images. This may be a part of the information that is provided as a part of the image upload to the system.

The prepared images are then preferably processed through a chosen pathway using photogrammetry software. This process will typically generate a mesh of 2D data (a consolidated 2D view) based on the 2D images that have been processed.

The mesh is then extracted.

The mesh is then preferably processed to provide the relative 3D camera positions available for the operator to use as the basis for movement of the constructed consolidated view. This processing will preferably estimate three-dimensional coordinates of points on an object or feature employing measurements made in two or more photographic images taken from different positions, the measurements based on the measurement references in at least one of the images. Common points are typically identified on each image. A line of sight can then preferably be constructed from the camera location to the point on the object. It is the intersection of these rays (triangulation) that will determines the three-dimensional location of the point.

An operator is then able to nominate at least one plane of interest in at least two images (typically using three points in each) or alternatively nominates at least one plane of interest in a 3D reconstruction.

The nominated points are then typically combined mathematically with the relative camera positions to estimate the true position of each nominated plane in 3D space. Note: Since there is actually only one true position if there were no errors these two (or more) estimates would coincide.

The translations necessary to align the planes identified in the images to the real position are then preferably identified.

These translations are then typically applied to all pixels within the area bounded by the three points from within each prepared image or these translations be applied to relevant points in the related 3D reconstruction.

These two (or more) created images are then preferably tuned until they coincide with each other to further remove introduced error. NOTE: The amount of adjustment could be fed back round the process loop in order to improve the outcome over multiple iterations.

This provides a close to true representation of the position and orientation and pixel map of the nominated plane in 3D space.

A normal to this plane is then preferably calculated which intersects the plane at a point midway between the three nominated points (or some other option).

A distance then preferably set or chosen although it is to be noted here that it is extremely difficult to quantify what is a "good" distance.

A finalview is then created and presented to the operator.

Distances identified on the finalview can be reported as ratios of the nominated reference or if the reference distance(s) have been specified as measures.

The method therefore creates a newview that represents what would be seen if the best position and orientation for relative measurement had been chosen from images that have been taken. This best position is preferably located at a position at the normal to the plane that the object(s) to be measured occur in.

The newview will typically have an image size such as to fit (at the highest pixel density possible) the area or object of interest.

The newview is preferably calculated from two or more pathways such that errors can be tuned out by either similarity scoring between the results or by operator interaction in a similar fashion to focusing to create a final view.

The newview representations may be further processed to again reduce the errors originally introduced by the low quality/size of the original photographic equipment to create a final image.

Furthermore, embodiments of the invention may be advantageous in preparing a property for repair, or making the property safe for an insurance company or other contractors. For example, the tradesperson may use the images to identify that temporary fencing is required, to make the site safe until the repairs are completed. As such, the tradesperson is able to take the suitable amount of fencing when visiting the site. This is particularly useful when a large storm hits and there is some delay until full repairs can be made.

While the above has been described with reference to an insurance company, the skilled addressee will readily appreciate that the system may be provided such that it is generic to all insurance companies. In particular, the system may be configured to operate with a plurality of different insurance companies, a plurality of different tradespeople, and a plurality of different customers. In such case, each customer may be associated with one or more insurance companies, and each tradesperson may be associated with one or more companies.

In such case, the system may operate independently from any of the insurance companies, and as such, each customer may enter his or her insurance details manually. The system may be set up to pre-fill one or more forms required by the associated insurance company in case of a claim, based upon data input by the user.

Furthermore, the invention may be used outside of insurance. In particular, the image based measurement features may be used in other industries, such as in architecture and by engineers and draftsman, and in relation to inspection services, such as pool fencing, building and pest control services.

Embodiments of the invention described above provide several advantages, including enabling claims to be processed without requiring multiple site visits by insurance companies or tradespeople, which in turn reduces costs and time, particularly in regional and remote areas. This may further reduce occupational health and safety issues associated with travelling and working in unfamiliar areas.

Furthermore, embodiments of the invention simplify the insurance claim lodgement process, as much of the manual process associated with traditional claim processing is alleviated. This in turn may also speed up the insurance claim process, and give control back to customers in relation to the process.

Embodiments of the present invention may also improve communication between the customer, the insurance company (e.g. the insurance company), and the tradesperson. Furthermore, the customer and the tradesperson may also be able to communicate after the damage has been repaired, which is particularly useful in case faults are identified in the work, or problems with the work later appear.

By also providing simplified renewal and insurance updates, embodiments of the invention also simplify the process of managing insurance policies, even outside of the claims process. Furthermore, the use of alerts and warnings may reduce the number of insurance claims, which in turn results in reduced overall insurance costs.

Embodiments of the present invention may also reduce the total number of fraudulent claims, by providing a means for an insurance company, for example, to verify data associated with images provided by the customer.

Yet further again, the system may reduce verbal communication issues relating to claims, as the system enables image based analysis of claim data. As an illustrative example, the tradespeople are less reliant on verbal descriptions from others, and in particular customers which have no industry training.

Embodiments of the invention may also reduce human error, particularly in relation to measurements and data entry.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An online insurance system including:
   a customer interface, configured to enable an insurance customer to enter insurance claim details;
   a tradesperson interface, configured to enable a tradesperson to select one or more points on an image, upon which a measurement is determined in relation thereto, and to provide cost estimates based at least in part on the insurance claims details; and
   an insurance company interface, configured to enable an insurance company to review the claim provided by the customer; and the cost estimates provided by the tradesperson,
   wherein the insurance system comprises a processor configured to generate and issue an alert to the customer, the alert being generated according to weather events, and wherein at least one of the customer interface, tradesperson interface or insurance company interface includes an online measurement tool including:
- receiving one or more images relating to an object;
- receiving at least two location identifiers relating to the object with reference to the images; and
- analysing the object with reference to the images and the location identifiers to generate a real-world measurement associated with the location identifiers.

2. An online insurance system as claimed in claim 1 wherein the insurance company interface is further configured to enable the insurance company to select the tradesperson.

3. An online insurance system as claimed in claim 1 wherein the system is configured to provide access to at least a portion of the insurance company interface prior to the tradesperson being provided with the tradesperson interface.

4. An online insurance system as claimed in claim 1 wherein the customer interface is configured to allow the insurance customer to gather evidence relating to the claim, in the form of one or more images captured and uploaded into the system.

5. An online insurance system as claimed in claim 4 wherein the customer interface is configured to automatically obtain global positioning system (GPS) data, and may associate the GPS data with the one or more images.

6. An online insurance system as claimed in claim 4 wherein the images comprise multiple images of an object from different angles.

7. An online insurance system as claimed in claim 4 wherein a measurement of one or more objects is performed by creating a three-dimensional model based on the images, and by determining the measurement with reference to the three-dimensional model.

8. An online insurance system as claimed in claim 4 wherein the system is configured to identify specific objects in the images.

9. An online insurance system as claimed in claim 4 wherein the system is configured to guide the customer through a predefined capture process to capture images.

10. An online insurance system as claimed in claim 9 wherein the system warns the customer when motion deviates from the pattern.

11. An online insurance system as claimed in claim 1 including:
- receiving, on a data interface, insurance claim details from an insurance customer;
- enabling an insurance company to remotely review the claim provided by the customer;
- receiving, on a data interface, cost estimates from a tradesperson according to the received insurance claim details; and
- enabling the insurance company to review the cost estimates provided by the tradesperson.

12. An online insurance system as claimed in claim 11 including automatically allocating an insurance claim, associated with the received insurance claim details, to the insurance company.

13. An online insurance system as claimed in claim 11 including allocating the insurance claim to the tradesperson.

14. An online insurance system as claimed in claim 1 including receiving a reference measurement with reference to the images, and developing the real world measurement with reference to the reference measurement.

15. An online insurance system as claimed in claim 1 including developing a three-dimensional model of the object, and developing the real world measurement with reference to the reference measurement.

16. An online insurance system as claimed in claim 1 wherein:
- the images are linkable via at least one common point in at least two images such as to allow the system to be able to relate the relative positions and aspects of the various images to each other in a mathematical basis; and/or,
- at least one feature of interest appears in a minimum of two images; and/or,
- a measurement reference appears in at least two images.

17. An online insurance system as claimed in claim 1 wherein a new view is created from at least one image that represents what would be seen from a best position and orientation for relative measurement.

18. An online insurance system as claimed in claim 17 wherein the best position is preferably located at a position at the normal to the plane that the object(s) to be measured occur in.

19. An online insurance system as claimed in claim 17 wherein:
- the new view has an image size such as to fit at the highest pixel density possible, an area or object of interest; and/or,
- the new view is calculated from two or more pathways such that errors can be tuned out by similarity scoring between results; and/or,
- the new view representations are further processed to again reduce the errors originally introduced by low quality/size of the at least one image.

* * * * *